United States Patent Office 3,415,181
Patented Dec. 10, 1968

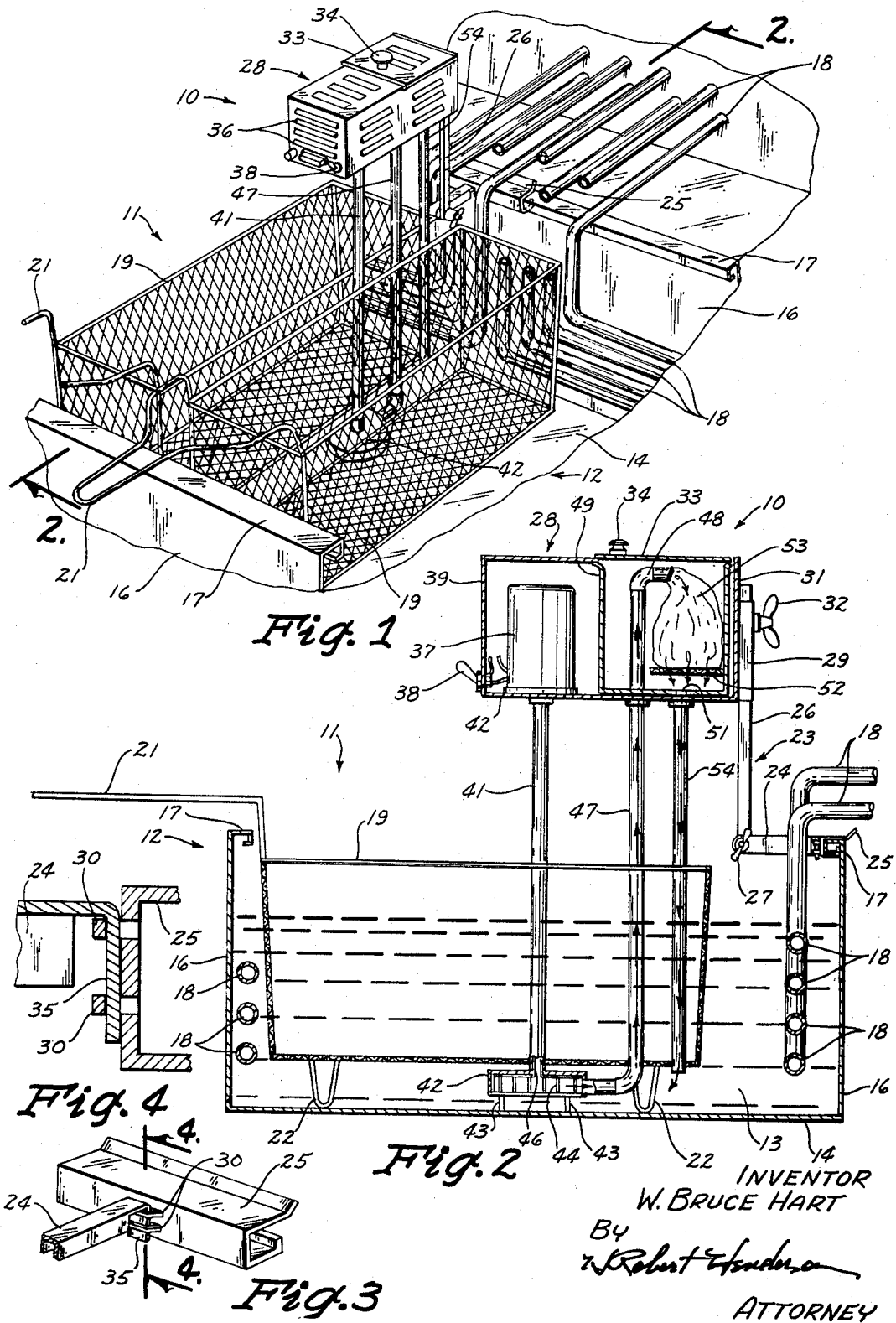
Dec. 10, 1968     W. B. HART     3,415,181
DEEP FAT FILTER APPARATUS
Filed May 4, 1967
INVENTOR
W. BRUCE HART
BY
ATTORNEY

**3,415,181
DEEP FAT FILTER APPARATUS**
Warren Bruce Hart, 7228 Burt St., Omaha, Nebr. 68114
Filed May 4, 1967, Ser. No. 636,208
8 Claims. (Cl. 99—408)

ABSTRACT OF THE DISCLOSURE

This invention pertains to a deep fat filter apparatus which is mounted in fluid communication with a deep fat fryer and is operable continuously and simultaneously to filter the cooking medium while food is being prepared. The apparatus includes a power driven pump disposed in the deep fat fryer, a filter unit fluidly connected to the pump, an inlet tube fluidly connecting the pump and filter unit, and an outlet tube fluidly connected to the filter unit for returning the filtered medium to the fryer.

Background of the invention

*Field of the invention.*—The field of art to which this invention pertains is generally the art of filtering foreign material from liquids such as are used in deep fat frying of food items.

*Description of the prior art.*—A search of the subject matter of this invention in Class 99, subclasses 403 and 408; and in Class 210, subclasses 167, 416, 460, 473 and 474. Generally, the results of the search, disclosed filtering devices which do not filter the cooking medium simultaneously with and continuously during the cooking process, which lessen the available cooking area, which interfere with the cooking process, which cannot readily be moved from one fryer to another, which are difficult to clean, and which require auxiliary tanks apart from the apparatus into which the medium is transferred for filtering and which require a pumping operation to return the medium to the fryer.

Commercial eating establishments such as restaurants and drive-ins continuously prepare large quantities of deep fat fried foods. French fried onions, potatoes, fish, chicken and the like are popular items which are usually fried in the same fat fryer in most establishments.

Many of the foods prepared for deep fat frying are breaded or coated with meal or sauce which gives the food a light flaky crust of brownish color upon being fried. However, part of this coating and sometimes even parts of the food break off during the frying process and drop off into the fat. As the fat is used over again for successive batches of food, these particles become re-fried until they take on a burnt appearance. The over-cooked particles deposit themselves on the later batches of food, detracting not only from the appearance of the food, but also from the flavor.

The particles which become deposited in the fat also speed the deterioration of the grease or cooking oil and causes it to become contaminated and rancid.

Most establishments normally follow the practice of cleaning the fat fryer and filtering the grease once each day at the close of business. Restaurant owners cannot take the fryer out of service during the day because of the effect on service to their customers, nor can many of them utilize a plurality of fryers to enable a more frequent cleaning thereof. The process followed, therefore, is to drain, pour or pump the grease from the fryer, filter the grease, clean the fryer, and then refill the fryer with filtered grease.

Summary of the invention

It is therefore an object of this invention to provide a deep fat fryer filtering apparatus which filters the grease simultaneously while food is being prepared within the fryer.

Another object of this invention is the provision of a filtering apparatus which can continuously filter the grease in a deep fat fryer for removal of the particles which separate from the cooking foods, thus preventing the possible attachment of these particles on later batches of food cooked in the fryer which detract from its appearance and affect its flavor.

A further object of this invention is the provision of a filtering apparatus adapted to be used within the containers of deep fat fryers presently in use which does not, when installed, lessen the possible cooking area.

Yet another object of this invention is the provision of a deep fat fryer filtering apparatus which is placeable directly within the fat container, and closely adjacent a basket or between a pair of baskets, and which filtering apparatus is continuously operable without interfering with the frying operation, and without interfering with the vertical movement of the basket or baskets.

A still further object of this invention is to provide a filter apparatus which is detachably mounted in a deep fat fryer, thus allowing for the use of the filter in a multiple installation of fryers.

Still another object of this invention is the provision of a deep fat fryer filtering apparatus which quickly and easily filters the grease without constant attention on the part of the operator and without the hazard of burns caused by handling hot grease.

Another object of the invention is to provide a filter apparatus which is easy to clean.

A further object of this invention is the provision of a filter apparatus which is compact, economical to manufacture, rugged in construction and extremely effective in use.

These objects, and other features and advantages of this invention will become more readily apparent upon reference to the following description when taken in conjunction with the accompanying drawings.

Brief description of the drawings

FIG. 1 is a fragmentary perspective view of a deep fat fryer with the filter apparatus of this invention mounted therein;

FIG. 2 is an enlarged sectional view taken along the lines 2—2 in FIG. 1;

FIG. 3 is a perspective view of the support bracket for the apparatus; and

FIG. 4 is an enlarged sectional view taken along the lines 4—4 in FIG. 3, and showing the connection of the apparatus linkage with the support bracket.

Description of the preferred embodiments

Referring to the drawings, the filter apparatus of this invention is indicated generally at 10 in FIGS. 1 and 2 attached to a conventional deep fat fryer 11. The fryer 11 comprises a container 12, adapted to hold cooking oil or grease 13 (FIG. 2), having a bottom 14 and sidewalls 16. The sidewalls are shown with an integral, inwardly extendnig, L-shaped rim 17 formed around the periphery of the top edge.

A pluarity of parallel heating elements 18 lead into and are disposed within the container 12, extending therearound adjacent the side walls 16. Disposed within the container 12 are a pair of spaced apart baskets 19, each having a handle 21 for lifting and carrying the baskets and a plurality of legs 22 for supporting the baskets in spaced relation on the bottom 14. The baskets are adapted to hold food items (not shown) which are cooked in the oil 13.

More specifically, the filter apparatus 10 includes a mounting unit 23, as best shown in FIG. 2, having a link 24 adapted to be detachably secured to a support bracket 25 (FIG. 3). The support bracket 25, formed from a channel, as best noted in FIG. 3 and having a pair of spaced apart projecting brackets 30 mounted on the face thereof, is adapted to be detachably mounted on the rim 17. The link 24 has a depending lug 35 (FIG. 4) disposed on one end thereof adapted to slide between the support bracket 25 and the brackets 30. In mounting the support bracket 25, it may be necessary to attach it to the rim away from the elements 18 and then to slide it underneath the elements to its desired position.

An elongated bar 26 (FIG. 2) is adjustably affixed to the other end of the link 24, as by a bolt and wing nut 27 or the like, at any one of a plurality of arcuately spaced positions. An upper structure 28 has a channel 29 secured to one end 31 thereof adapted to slideably receive the free end of the bar 26. A wing bolt 32 threadably mounted in the channel acts as a locking unit to lock the structure to the bar 26.

The upper structure 28, as best noted in FIG. 1, is rectangular in shape with approximately one-half of its top open (FIG. 2). Slideably mounted on the top is a door 33 having a graspable knob 34 mounted thereon for sliding the door 33. A plurality of louvers 36 (FIG. 1) are formed in the sidewalls and end walls of the structure 28 for the purpose of ventilation.

An electric motor 37 (FIG. 2) is mounted in the forward part of the structure 28, and is wired to an on-off switch 38 mounted in an end wall 39. The switch 38 and motor 37 are also wired to an electric source (not shown). A depending conduit 41 is secured to the bottom 42 of the structure in axial alignment with the longitudinal axis of the motor 37. Mounted on free end of the conduit 41 is a pump housing 42 having a plurality of depending legs 43 for supporting the housing in spaced relation on the bottom 14 of the fryer 12. An opening (not shown) is formed in the side wall of the pump housing 42, for a purpose hereinafter described.

Rotatably mounted in the pump housing 42 is an impeller 44 (FIG. 2) which is connected to the motor 37 by a drive shaft 46 housed in the conduit 41. The bottom of the pump housing 42 is open thus allowing fluid communication between the fluid 13 and the impeller 44.

An L-shaped tube 47 (FIG. 2) is fluidly connected at one end thereof to the pump housing 42 and extends upwardly through the bottom wall of the structure 28. As best noted in FIG. 2 the tube 47 is disposed parallel to the conduit 41. An elbow 48 is mounted to the upper end of the tube 47.

Disposed in spaced relation to the motor 37 within the structure 28 is a container 49 (FIG. 2) having a pair of openings formed in the bottom thereof, the first opening (not shown) is in alignment with the longitudinal axis of the tube 47 and the second opening 51 is laterally spaced therefrom. A screen 52 is secured to a side wall of the container in spaced relation to the bottom thereof, as best shown in FIG. 2. Seated on the screen is a filter bag 53 having an open end which is detachably secured to the open end of the elbow 48.

A depending second tube 54 is secured to the bottom of the structure in alignment with the hole 51 of the container, with the free end disposed in the cooking oil 13. As shown in FIG. 1, the conduit 41, the tubes 47 and 54, and the bar 26 are all disposed in a common plane, thus allowing the filter apparatus 10 to be inserted between the baskets 19.

In operation, the apparatus is placed in the container 11 (FIG. 1) with the legs 43 of the pump housing 42 disposed on the bottom 14 of the container 11 and with the mounting unit 23 secured to the rim of the fryer. As the design of deep fat fryers may vary the supporting bracket 25 will necessarily have to be redesigned accordingly. The upper structure 28 is adapted to slide up or down on the bar 26 depending on the depth of the container 12, and is lockable by the wing bolt 32 in a position necessitated by the depth of the fryer 11.

The motor 37 (FIG. 2) is connected to a power source and energized by the on-off switch 39 which causes the impeller 44 to rotate. The rotation of the impeller 44 pumps the cooking oil 13 and any foreign matter contained therein through the L-shaped tube 47 and elbow 48 into the filter bag 53. The cooking oil 13 filters through the bag 53, while the foreign matter is retained therein. The filtered oil 13 flows from the bag 53 and through the second tube 54, by gravity, and back into the fryer 12.

To remove the foreign matter from the structure 28 the bag 53 is removed from the elbow 48 and either cleaned or disposed of and a new or cleaned bag is fastened to the elbow 48. If, for some reason the impeller becomes clogged, the apparatus 10 can be pivoted at its mounting unit 23 to allow easy access to the pump housing 42.

It, therefore, can be seen that the fryer can be continuously operated during the filtering operation. Also by arranging the depending tubes 47 and 54, conduit 41 and bar 26 in a common plane, with the bulky structure 28 disposed above the cooking area and the pump housing 42 disposed below the baskets, a minimum amount of effective cooking area is required for the installation and operation of the apparatus 10. Furthermore, normal movement of the baskets 19 is not disturbed; in fact they remain in place, and are manipulated as usual while the filter apparatus 10 simultaneously performs its filtering operation.

Although a preferred embodiment of this invention has been described and disclosed hereinbefore, it is to be remembered that various modifications and alternate constructions can be made thereto without departing from the true spirit and scope of the invention as defined in the appended claims.

I claim:
1. A filter apparatus for use within a deep fat fryer containing fluid held in a container having an upper generally horizontal edge and adapted to hold one or more baskets, the apparatus comprising:
  means for filtering the fat;
  power means mounted adjacent said filter means;
  pump means disposed in the fluid and operably connected to said power means;
  a first tube fluidly interconnecting said filter means and said pump means;
  said pump means operatble to pump the fluid from the fryer to said filter means; and
  a second tube fluidly connected to said filter means for returning the filtered fluid to the container, said first tube and said second tube disposed in a common, substantially vertical, plane.

2. A filter apparatus as defined in claim 1, and further wherein said power means and said pump means are connected by an enclosed drive shaft, said shaft also disposed in said common plane.

3. A filter apparatus as defined in claim 2, and further wherein said pump means rests upon the bottom of the container.

4. A filter apparatus as defined in claim 3, and further wherein said apparatus comprises a housing enclosing said power means and said filter means, and disposed above the baskets.

5. A filter apparatus as defined in claim 4, and further wherein said apparatus comprises a mounting unit for supporting said housing on an edge of the container.

6. A filter apparatus as defined in claim 5, and further wherein said mounting unit includes linkage extended toward the edge, which linkage also is disposed in said common plane.

7. A filter apparatus as defined in claim 6, and further wherein said mounting unit includes an elongated, substantially straight bracket adapted to grasp and slide longitudinally along the edge, and to which bracket said linkage is removably connectible.

8. A filter apparatus as defined in claim 7, and further wherein said drive shaft, first and second tubes, and linkage are placeable alongside and parallel to a side of a basket, whereby the basket is vertically movable in the container.

References Cited

UNITED STATES PATENTS

| | | | |
|---|---|---|---|
| 2,515,538 | 7/1950 | Wall | 210—169 |
| 2,533,936 | 12/1950 | Holmes | 210—169 |
| 2,783,893 | 3/1957 | Romanoff | 210—169 X |
| 3,210,193 | 10/1965 | Martin | 99—403 X |

ROBERT W. JENKINS, *Primary Examiner.*

U.S. Cl. X.R.

210—167